United States Patent [19]

Ohtsuka

[11] Patent Number: 4,951,519
[45] Date of Patent: Aug. 28, 1990

[54] ROTATION TRANSMITTER

[75] Inventor: Naotoshi Ohtsuka, 49-7 Fujimidai, Mishima, Japan

[73] Assignees: Naotoshi Ohtsuka, Mishima; Yoshio Horiya; Nihon Seiki Company, Ltd., both of Numazu, all of Japan

[21] Appl. No.: 373,282

[22] Filed: Jun. 29, 1989

[30] Foreign Application Priority Data

Jun. 29, 1988 [JP] Japan ................ 63-161409
Aug. 12, 1988 [JP] Japan ................ 63-201713

[51] Int. Cl.⁵ .................... F16H 1/16; F16H 55/22
[52] U.S. Cl. ........................ 74/425; 74/458
[58] Field of Search ............ 74/89.14, 425, 458, 74/500

[56] References Cited

U.S. PATENT DOCUMENTS

| 2,451,998 | 10/1948 | Wahlberg et al. | 74/458 |
| 3,377,879 | 4/1968 | Shiwaku | 74/425 |
| 3,468,179 | 9/1969 | Sedgwick et al. | 74/425 |
| 3,489,026 | 1/1970 | Bond | 74/425 |
| 3,494,215 | 2/1970 | Fengler | 74/425 X |
| 3,672,239 | 6/1972 | Titt | 74/425 |

FOREIGN PATENT DOCUMENTS

| 1086681 | 2/1955 | France |  |
| 1261122 | 6/1960 | France |  |
| 3822759 | 10/1936 | Japan |  |
| 461209 | 10/1968 | Switzerland |  |
| 1290250 | 9/1972 | United Kingdom |  |
| 1464770 | 2/1977 | United Kingdom | 74/425 |
| 2164719 | 3/1986 | United Kingdom | 74/425 |

Primary Examiner—Allan D. Herrmann
Attorney, Agent, or Firm—Oblon, Spivak, McClelland, Maier & Neustadt

[57] ABSTRACT

A rotation transmitter includes a worm shaft having an hourglass-shaped portion at the center thereof, a plurality of metal balls arranged in a row on a ball circulation path, a cylindrical housing for rotatably accommodating the worm shaft therein, a worm wheel inserted in an axial slot in the housing and provided in the outer periphery thereof with ball fitting grooves for receiving the balls, and holding means for holding the worm shaft within the housing so that the worm shaft is rotatable in a state of meshing with the worm wheel via the balls. A helical ball guide groove is formed in the outer periphery of the hourglass-shaped portion of the worm shaft, and a circulation bore penetrates the hourglass-shaped portion obliquely from one side to the other side thereof so that the opposite ends thereof communicate with the associated ends of the helical ball guide groove via tangentially curved guide holes. The ball circulation path is thus constituted by the guide groove and circulation bore.

3 Claims, 6 Drawing Sheets

ROTATION TRANSMITTER

BACKGROUND OF THE INVENTION

1. Field of the Invention

This invention relates to a rotation transmitter using balls and, more particularly, to a rotation transmitter which comprises a worm shaft with a central hourglass-shaped portion having a circulation path constituted by a helical ball guide groove and a bore penetrating the hourglass portion, a plurality of metal balls accommodated in the circulation path and a worm wheel with the outer periphery thereof formed with ball fitting grooves in which the metal balls are fitted.

2. Prior Art Statement

Japanese Pat. Publication No. SHO 38-22759 discloses a speed reduction device in which an hourglass worm shaft has a helical depressed line such that a plurality of balls are accommodated in the depressed line to form a raised line, and the raised line formed of the balls is continuously or closely fitted in a depressed line of a worm wheel for transmission of rotation.

In the conventional speed reduction device, however, the worm shaft has an axially centrally extending bore which communicates with the opposite ends of the helical depressed line formed in the outer periphery. The axial bore is sealed at each end by a collar. Each collar is formed with a guide hole or path which extends such that it is first curved from the axis of the collar toward the outer periphery thereof and is then curved to extend in a tangential direction so as to communicate with each end of a helical ball guide path constituted by the depressed lines of the worm shaft and worm wheel.

The guide hole or path is curved sharply and particularly perpendicularly at its section communicating with the axial bore in the worm shaft. In such curved portions of the hole or path, the balls are difficult to roll or move and liable to seize due to the generation of frictional heat.

In such rotation transmitter having the raised line formed of a plurality of balls which are closely fitted in a depressed line of the worm shaft, in order to efficiently transmit the rotation of the worm shaft to the worm wheel, it is desired that the plurality of closely fitted balls roll smoothly for movement along the helical depressed line and axial bore formed in the worm shaft.

In the well-known speed reduction device, the worm shaft with the plurality of balls closely fitted in the helical ball guide path is surrounded by a notched hollow cylinder and supported by a casing such that its axis and the axis of the worm wheel cross each other when it is in mesh with the worm wheel. With this structure, however, the assembly is complicated and the state of mesh between the worm shaft and worm wheel cannot be readily adjusted.

OBJECT AND SUMMARY OF THE INVENTION

This invention has been accomplished in the light of the above, and one object is to provide a rotation transmitter which permits smooth movement of a plurality of metal balls along a ball guide groove and bore, can efficiently transmit rotation and is free from seizure due to frictional heat in long use.

Another object of the invention is to provide a rotation transmitter in which the worm shaft and worm wheel are made integral into a meshed state by a simple mechanism and which can be readily incorporated into an associated apparatus.

To attain the above objects of the invention, there is provided a rotation transmitter which comprises a worm shaft with a central hourglass portion having the outer periphery thereof formed with a helical ball guide groove constituting a ball circulation path in conjunction with a circulation bore penetrating the worm shaft obliquely from one side to the other side of the outer periphery thereof and having each end communicating via a tangentially curved guide hole with each associated end of the helical ball guide groove, a plurality of metal balls fitted closely in a row in the ball circulation path, a cylindrical housing having an axial slot and internally rotatably accommodating the worm shaft, a worm wheel inserted in the axial slot of the cylindrical housing and having the outer periphery thereof formed with ball fitting grooves for receiving the metal balls, and holding means for holding the worm shaft in the cylindrical housing to rotatably mesh with the worm wheel via the metal balls.

With the helical ball guide groove constituting the ball circulation path in conjunction with the circulation bore penetrating the worm shaft obliquely from one side to the other side of the outer periphery thereof and having each end communicating via a tangentially curved guide hole with each associated end of the helical ball guide groove, during the transmission of the rotation of the worm shaft to the worm wheel, the plurality of metal balls are allowed to roll and move along the ball circulation path, thus suppressing the generation of frictional heat. In addition, since the worm shaft is held rotatable about the outer periphery of the worm wheel in a state of meshing with the worm wheel via the metal balls, it is possible to readily make adjustment of the mesh and readily incorporate the rotation transmitter into an associated apparatus.

The above and other objects and features of the invention will become more apparent from the following detailed description with reference to the accompanying drawings.

DETAILED DESCRIPTION OF THE PREFERRED EMBODIMENTS

Figure 1:
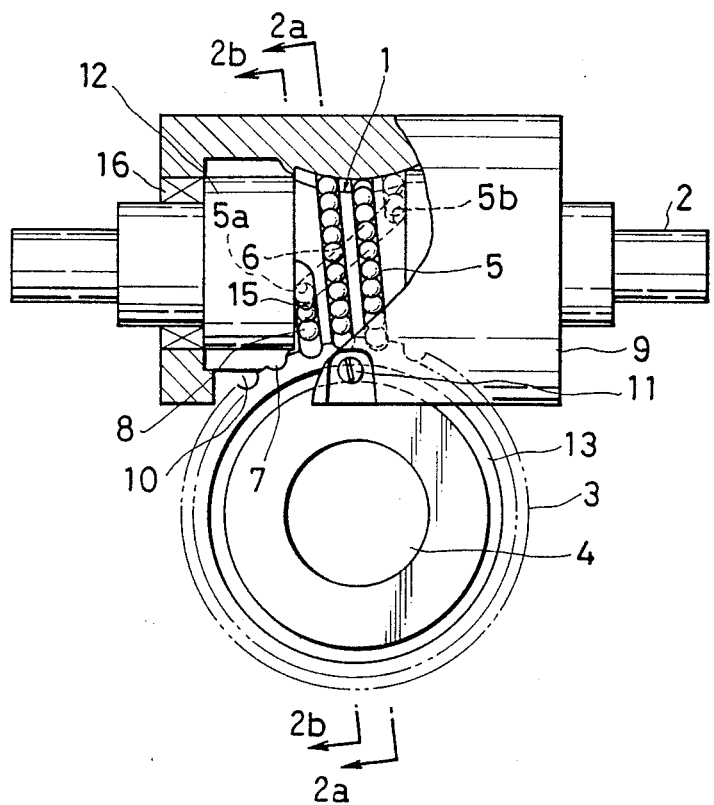
FIG. 1 is a front view, partly in section, showing one embodiment of the rotation transmitter according to the invention.

FIGS. 1 to 4 illustrate an embodiment of the rotation transmitter according to the invention. Reference numeral 2 designates an hourglass worm shaft which is driven by drive means (not shown), for instance a motor. The worm shaft 2 has a central hourglass-shaped portion which is sandwiched between two side rings 12. The central hourglass-shaped portion has a helical ball guide groove 5 having a semicircular sectional profile. The helical ball guide groove 5 has its opposite ends 5a and 5b communicating with respective open ends of a circulation bore 6 which penetrates the worm shaft 2 obliquely from one side to the opposite side of the outer periphery of the hourglass-shaped portion, thus forming a ball circulation path.

A plurality of metal balls 8 are continuously or closely fitted in a row in the ball guide groove 5 and circulation bore 6 and constitute a worm section 1.

The worm section 1 is accommodated in a cylindrical housing 9 having an axial slot 10. The worm shaft 2 with the central hourglass-shaped portion is rotatably supported by ball bearings 16 provided at opposite ends of the cylindrical housing 9. The opposite ends of the worm shaft 2 project outwardly from the housing 9 and one end thereof is connected to drive means (not shown).

The slot 10 of the cylindrical housing 9 has a width sufficient for insertion of a worm wheel 3 to be described later. Opposite side portions of the housing 9 facing each other across the slot 10 are provided with respective support screws 11 such that the leading ends of the screws 11 project into the slot 10 and face each other when the screws are driven home.

An inner peripheral wall of the cylindrical housing 9 facing the central hourglass-shaped portion of the worm shaft 2 projects inwardly to reduce the space over the ball guide groove 5, thus preventing the metal balls 8 not in mesh with the worm wheel 3 from getting out of or being detached from the ball guide groove 5.

The worm wheel 3 has a central hole 4 in which an output shaft (not shown) is fitted, and its opposite side surfaces are each formed with an annular groove 13 concentric with the hole 4.

The outer periphery of the worm wheel 3 is formed with a plurality of ball fitting grooves 7 having a semicircular sectional profile and arranged at the same intervals as those of the individual turns of the helical ball guide groove 5 of the worm section 1.

To assemble the rotation transmitter, the worm wheel 3 is inserted into the cylindrical housing 9 through the slot 10 such that the ball fitting grooves 7 fit on hemispherical portions of the metal balls 8 received in the ball guide groove 5 of the worm section 1. In this state, the screws 11 provided on the opposite sides of the slot 10 are screwed such that their free ends facing each other project into the slot 10 and are received in the annular grooves 13 of the worm wheel 3 from the opposite sides. In this way, the worm wheel 3 is mounted such that it is rotatable relative to the housing 9 in mesh with the worm section 1 in the housing 9.

Figure 2:
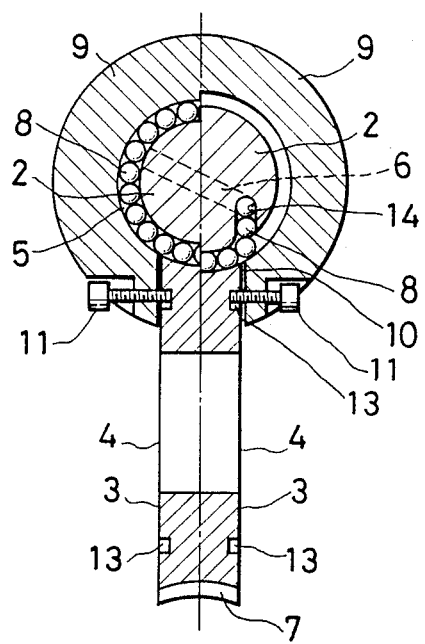
FIG. 2 is a sectional view with the left half taken along line IIa—IIa in FIG. 1 and the right half taken along line IIb—IIb in FIG. 1.
Figure 3:
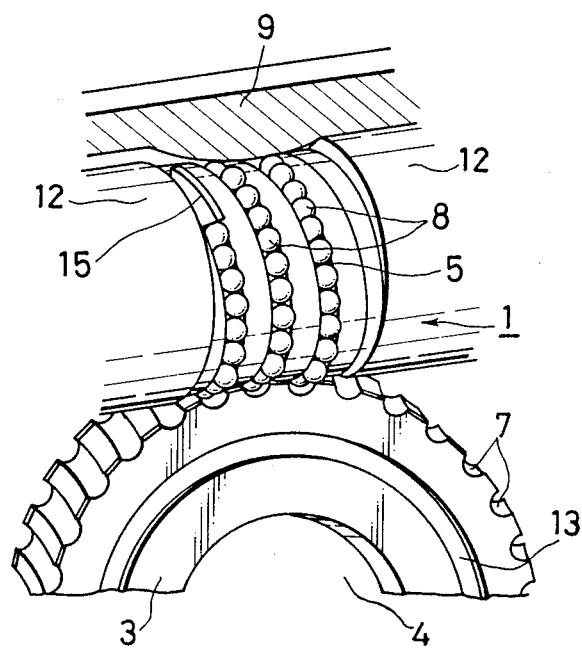
FIG. 3 is a perspective view showing a state of mesh between a worm shaft and a worm wheel in the rotation transmitter of FIG. 1.
Figure 4:
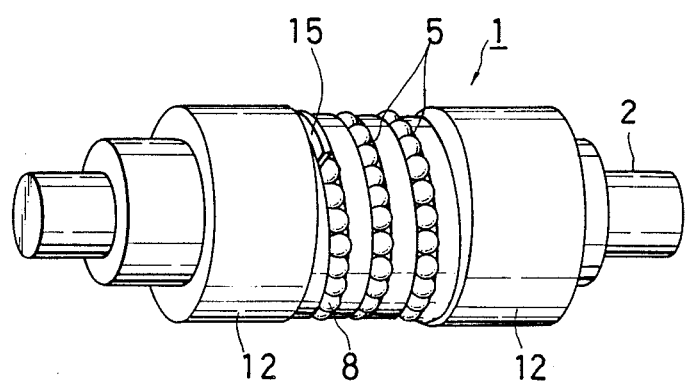
FIG. 4 a perspective view showing the vicinity of an opening of a ball circulation path of the worm shaft of the rotation transmitter shown in FIG. 1.

The opposite ends 5a and 5b of the helical ball guide groove 5 of the worm section 1 communicate with the open ends of the circulation bore 6 obliquely penetrating the worm section 1. Each open end of the circulation bore 6 is provided with a guide hole 14 which is bent tangentially from the outer periphery of the worm shaft 2 (FIG. 2 or 4). At the communicating section, the open end is covered by a projecting guide 15 (FIGS. 1 to 4).

The guide 15 can be readily provided such that it is supported by each side ring 12 in contact with the central hourglass-shaped portion of the worm shaft 2.

Figure 7:
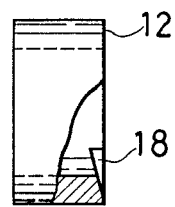
FIG. 7 is a front view, partly in section, showing a side ring of a rotation mechanism in a further embodiment of the invention.
Figure 8:
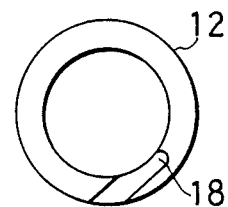
FIG. 8 is a right side view showing the side ring of FIG. 7.
Figure 9:
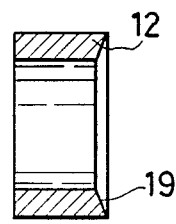
FIG. 9 is a sectional view showing a different example of the side ring.

It is possible to form a tangential guide groove 18 in the surface of each side ring 12 in contact with the hourglass-shaped portion of the worm shaft (FIGS. 7 and 8) or to form the contact surface to be an inwardly inclined surface 19 (FIG. 9) for aiding the guide 15.

Figure 5:
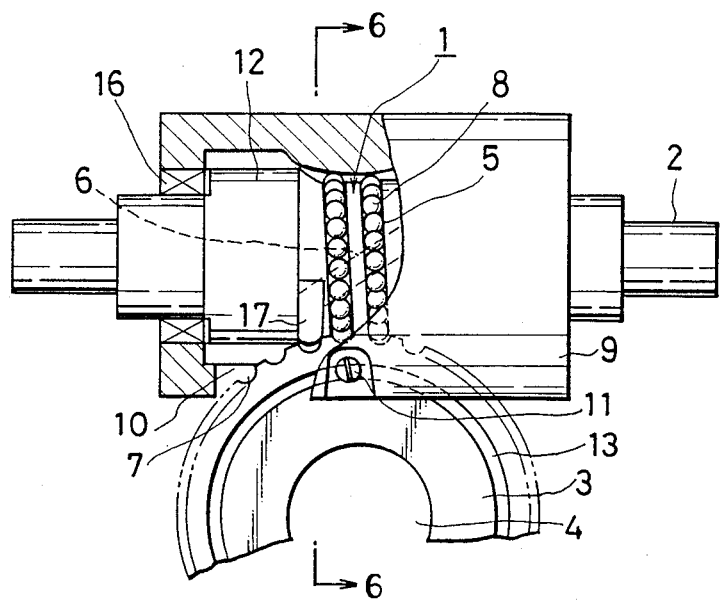
FIG. 5 is a front view, partly in section, showing a different embodiment of the rotation transmitter according to the invention.
Figure 6:
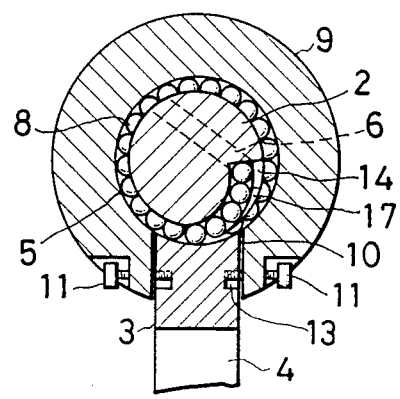
FIG. 6 is a sectional view taken along line VI—VI in FIG. 5.

FIGS. 5 and 6 show a different embodiment of the rotation transmitter according to the invention. In this embodiment, a guide pipe 17 curved smoothly and having an inner diameter permitting passage of the metal balls 8 is inserted in the guide hole 14 provided at each section of communication between the ball guide groove 5 and the circulation bore 6 of the worm shaft 2. With the guide pipe 17 inserted in the guide hole 14 in this way, machining of the guide hole 14 for permitting smooth passage of the balls can be dispensed with, thus facilitating manufacture.

In the rotation transmitter having the above construction, by rotating the worm shaft 2 with suitable means the worm section 1 and worm wheel 3 are rotated at a predetermined speed reduction ratio in a mutually coupled state because the metal balls 8 of the worm section 1 are in mesh with the ball fitting grooves 7 of the worm wheel 3. At this time, the plurality of metal balls 8 closely fitted in the ball guide groove 5 are successively moved along the ball guide groove 5 in rolling contact with the ball fitting grooves 7 of the worm wheel 3 and, at the terminal end 5b of the ball guide groove 5, they are pushed into the end opening of the circulation bore 6 by the guide 15, then moved smoothly along the tangentially smoothly curved guide hole 14 to enter the circulation bore 6 obliquely penetrating the worm shaft 2 from one side to the other side of the outer periphery, and then they emerge to the starting end 5a of the ball guide groove 5 via the other end guide hole 14 to move along the ball guide groove 5 and mesh with the worm wheel 3. In this way, rotation is transmitted.

As has been described in the foregoing, according to the invention the metal balls which are closely fitted in the ball guide groove of the worm section and fitted in ball fitting grooves of the worm wheel are caused to roll along the ball guide groove and circulation bore smoothly for circulation. Thus, the frictional resistance can be greatly reduced, the rotation of the worm shaft can thus be efficiently transmitted to the worm wheel, and it is possible to permit ready high-speed rotation of the worm section and eliminate backlash. Further, since the portions of the worm section and worm wheel meshing with each other via metal balls are covered by the cylindrical housing, protection from dust and the life of the lubricant can be improved.

Further, the state of mesh between the worm section and the worm wheel can be readily adjusted and maintained by the holding means provided in the cylindrical housing, and detachment of metal balls received in the state of mesh can be prevented without any casing for supporting the worm section and output shaft of the worm wheel. Thus, the rotation transmitter according to the invention can be readily handled and easily incorporated into an associated apparatus.

What is claimed is:

1. A rotation transmitter comprising:

a worm shaft with a central hourglass-shaped portion having the outer periphery thereof formed with a helical ball guide groove constituting a ball circulation path in conjunction with a circulation bore penetrating said central portion obliquely from one side to the other side of the outer periphery thereof and having each end communicating via a tangentially curved guide hole with each associated end of said helical ball guide groove;

a plurality of metal balls fitted closely in a row in said ball circulation path;

a cylindrical housing having an axial slot and internally rotatably accommodating said worm shaft;

a worm wheel inserted in said axial slot of said cylindrical housing and having ball fitting grooves formed in the outer periphery thereof for receiving said metal balls and annular grooves formed in the opposite side surfaces of a portion thereof inserted in said axial slot; and holding means comprising a pair of screws which face each other, project into said slot from opposite sides thereof, and are received in said annular grooves for holding said worm shaft in said cylindrical housing to be rotatably in mesh with said worm wheel via said metal balls.

2. The rotation transmitter according to claim 1, wherein the opening of each said guide hole is covered by a guide.

3. The rotation transmitter according to claim 1, wherein a guide pipe having an inner diameter permitting passage of said metal balls is inserted in said guide hole.

* * * * *